United States Patent
Moon et al.

(10) Patent No.: US 10,236,720 B2
(45) Date of Patent: Mar. 19, 2019

(54) WIRELESS POWER TRANSFER SYSTEM AND DRIVING METHOD THEREOF

(71) Applicant: FAIRCHILD KOREA SEMICONDUCTOR LTD, Bucheon-si (KR)

(72) Inventors: SangCheol Moon, Daejeon (KR); Gwanbon Koo, Bucheon-si (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 920 days.

(21) Appl. No.: 14/498,140

(22) Filed: Sep. 26, 2014

(65) Prior Publication Data

US 2015/0084428 A1 Mar. 26, 2015

Related U.S. Application Data

(60) Provisional application No. 61/882,705, filed on Sep. 26, 2013.

(30) Foreign Application Priority Data

Sep. 12, 2014 (KR) ........................ 10-2014-0121346

(51) Int. Cl.
- *H02J 5/00* (2016.01)
- *H02J 50/12* (2016.01)
- *H02J 7/02* (2016.01)
- *H02J 17/00* (2006.01)

(52) U.S. Cl.
CPC .............. *H02J 50/12* (2016.02); *H02J 5/005* (2013.01); *H02J 7/025* (2013.01); *H02J 17/00* (2013.01)

(58) Field of Classification Search
CPC ............ H02J 17/00; H02J 50/12; H02J 5/005
See application file for complete search history.

(56) References Cited

U.S. PATENT DOCUMENTS

| 7,508,183 | B2 * | 3/2009 | Chen ...................... H02M 3/156 323/285 |
| 7,719,243 | B1 * | 5/2010 | Balogh ................. H02M 3/156 323/280 |
| 8,050,068 | B2 | 11/2011 | Hussmann et al. |
| 8,093,758 | B2 | 1/2012 | Hussmann et al. |
| 2012/0050931 | A1 * | 3/2012 | Terry ....................... H02H 9/04 361/91.5 |

(Continued)

FOREIGN PATENT DOCUMENTS

JP 403131245 A * 10/1989

*Primary Examiner* — Jared Fureman
*Assistant Examiner* — Emmanuel Dominique
(74) *Attorney, Agent, or Firm* — AMPACC Law Group, PLLC

(57) ABSTRACT

A wireless power transmission system according to an exemplary embodiment of the present invention transmits power from a primary side to a secondary side, and includes: a secondary coil provided at the secondary side; a capacitor and a control switch electrically coupled in series between lateral ends of the secondary coil; and a regulation controller controlling a switching operation of the control switch according to a result of comparison between a control signal synchronized by a frequency at the primary side and a feedback signal corresponding to an output of the wireless power transmission system.

11 Claims, 4 Drawing Sheets

(56) References Cited

U.S. PATENT DOCUMENTS

| | | | | |
|---|---|---|---|---|
| 2012/0153903 A1* | 6/2012 | Kim | ................... | H02H 7/1252 |
| | | | | 320/148 |
| 2013/0043737 A1* | 2/2013 | Yeo | ................... | H02J 17/00 |
| | | | | 307/104 |
| 2013/0099591 A1* | 4/2013 | Yeo | ................... | H02M 3/3376 |
| | | | | 307/104 |
| 2013/0293192 A1* | 11/2013 | Abe | ................... | B60L 11/123 |
| | | | | 320/108 |
| 2013/0342026 A1* | 12/2013 | Mishina | ................ | H02J 5/005 |
| | | | | 307/104 |
| 2016/0013663 A1* | 1/2016 | Zhang | ................... | H02J 50/12 |
| | | | | 307/104 |

\* cited by examiner

WIRELESS POWER TRANSFER SYSTEM AND DRIVING METHOD THEREOF

CROSS-REFERENCE TO RELATED APPLICATION

This application claims priority to and the benefit of U.S. Patent Application No. 61/882,705 filed in the USPTO on Sep. 26, 2013, and priority to and the benefit of Korean Patent Application No. 10-2014-0121346, filed with the Korean Intellectual Property Office on Sep. 12, 2014, the entire contents of which are incorporated herein by reference.

BACKGROUND OF THE INVENTION (a) Field of the Invention

An exemplary embodiment of the present invention relates to a wireless power transmission system and a driving method thereof.

(b) Description of the Related Art

A wireless power transmission system generates an AC electromagnetic field at a primary side using a conductive coil, and a second conductive coil at a secondary side receives power from the AC electromagnetic field generated at the primary side.

A pre-regulator or a post-regulator may be provided to control output of the wireless power transmission system.

For example, in a pre-regular type wireless power transmission system, information on an output voltage needs to be fed back through RF communication. Accordingly, an RF communication circuit is additionally required together with a regulator.

In a post-regulator type wireless power transmission system, an active load is required for matching secondary-side impedance with primary-side impedance. Accordingly, an active load is additionally required together with a regulator.

As described, a conventional wireless power transmission system requires an RF communication circuit or an active load together with a regulator according to a type of the regulator. Such addition of constituent elements may cause increase in size and power consumption.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a wireless power transmissions system that can minimize additional constituent elements and improve consumption power, and a driving method thereof.

A wireless power transmission system according to an exemplary embodiment of the present invention transmits power from a primary side to a secondary side. The wireless power transmission system includes: a secondary coil provided at the secondary side; a capacitor and a control switch electrically coupled in series between lateral ends of the secondary coil; and a regulation controller controlling a switching operation of the control switch according to a result of comparison between a control signal synchronized by a frequency at the primary side and a feedback signal corresponding to an output of the wireless power transmission system.

The regulation controller may generate the control signal synchronized by the frequency at the primary side by rectifying a voltage that detects a currents flowing to the secondary side.

Impedance at the secondary side may be changed according to the switching operation of the control switch.

The regulation controller includes: a current sensor sensing a current flowing to the secondary side and generating a sense voltage; a rectifier generating the control signal by rectifying the sense voltage; a comparator comparing the control signal with the feedback signal; and a gate driver generating a gate voltage according to an output of the comparator.

The wireless power transmission system further includes: an error amplifier outputting a result of comparison between the output voltage and a predetermined reference voltage; and a compensator coupled between an output terminal and an inverse terminal of the error amplifier to generate an error voltage as the feedback voltage by compensating an output of the error amplifier.

The wireless power transmission system further includes a first resonance capacitor including a first electrode coupled to a first end of the secondary coil, wherein the capacitor and the control switch may be coupled in series between a second electrode of the first resonance capacitor and a second end of the secondary coil.

A driving method of a wireless power transmission system transmitting power from a primary side to a secondary side, according to an exemplary embodiment of the present invention includes: generating a control signal using a current flowing to the secondary side; generating a feedback signal corresponding to an output of the wireless power transmission system; and generating a feedback signal corresponding to an output of the wireless power transmission system; and The wireless power transmission system may include a capacitor and a control switch electrically coupled in series between lateral ends of a secondary coil. The control of the impedance at the secondary side includes controlling a switching operation of the control switch according to a result of comparison between the control signal and the feedback signal.

The generating the control signal includes: generating a sense voltage by sensing a current flowing to the secondary side; and generating the control signal by rectifying the sense voltage.

The generating the feedback signal includes generating an error voltage with the feedback signal by compensating a result of comparison between a voltage corresponding to an output voltage and a predetermined reference voltage.

According to the exemplary embodiments of the present invention, a wireless power transmission system that can minimize additional constituent elements and improve consumption power, and a driving method thereof can be provided.

DETAILED DESCRIPTION OF THE EMBODIMENTS

Figure 1:
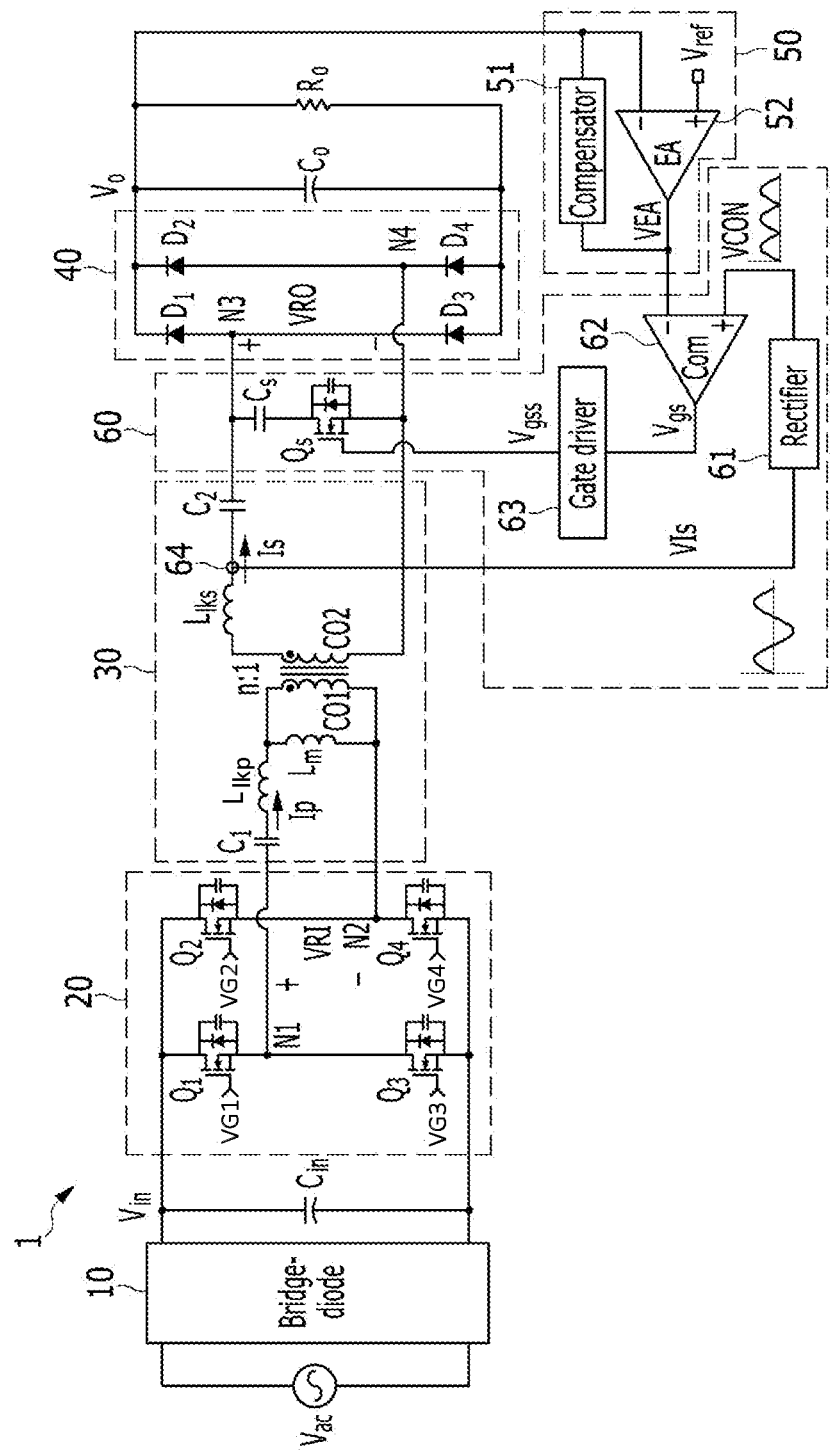
FIG. 1 shows a wireless power transmission system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 shows a wireless power transmission system according to an exemplary embodiment of the present invention.

As shown in FIG. 1, a wireless power transmission system 1 includes a bridge-diode 10, a full-bridge inverter 20, a resonator 30, a rectification circuit 40, an error voltage generator 50, and a regulation controller 60.

The bridge-diode 10 full-wave rectifies an AC input Vac. The AC input Vac passed through the bridge-diode 10 is smoothened by a capacitor Cin such that an input voltage Vin is generated. The input voltage Vin is supplied to the full-bridge inverter 20.

In FIG. 1, the wireless power transmission system 1 is implemented with the full-bridge inverter, but the present invention is not limited thereto. For example, the wireless power transmission system 1 may be implemented with a half-bridge inverter.

The full-bridge inverter 20 is an exemplary means for conversion of the input voltage Vin to a square wave. The full-bridge inverter 20 includes four switches Q1 to Q4, and the input voltage Vin is converted to the square wave according to switching operations of the four switches Q1 to Q4.

Four gate voltages VG1 to VG4 are respectively input to gates of the four switches Q1 to Q4. The switches Q1 to Q4 are turned by enable-level (i.e., high-level) gate voltages VG1 to VG4 and turned off by disable-level (i.e., low-level) of the gate voltages VG1 to VG4. A node N1 and a node N2 are output nodes of the full-bridge inverter 20.

The switch Q1 is connected between the input voltage Vin and the node N1, and the switch Q2 is connected between the input voltage Vin and the node N2. The switch Q3 is connected between the node N1 and a primary-side ground, and the switch Q4 is connected between the node N2 and the primary-side ground.

When the switch Q1 and the switch Q4 are in the turn-on state and the switch Q2 and the switch Q3 are in the turn-off state, a square-wave voltage VRI is the input voltage Vin. When the switch Q2 and the switch Q3 are in the turn-on state and the switch Q1 and the switch Q4 are in the turn-off state, the square-wave voltage VRI is −Vin voltage, which is the opposite polarity of the input voltage Vin.

The resonator 30 includes a primary coil CO1, a secondary coil CO2, a resonance capacitor C1, and a resonance capacitor C2. The resonator 30 resonates the primary-side square wave supplied from the full-bridge inverter 20 to transmit power to the secondary side.

The resonance capacitor C1 is connected between the primary coil CO1 and the node N1. The square-wave voltage VRI may be converted to a sine wave by resonance between leakage inductance LIkp and magnetizing inductance Lm at the primary-side coil CO1 and the resonance capacitor C1.

The secondary coil CO2 and the resonance capacitor C2 are connected at the secondary side, and a turn ratio between the number of turns of the primary coil CO1 and the number of turns of the secondary coil CO2 is n:1 (turns of CO1:turns of CO2). A voltage VRO between the node N3 and the node N4 may be generated with a sine wave due to resonance between leakage inductance LIks of the secondary coil CO2 and the resonance capacitor C2.

The rectification circuit 40 and a capacitor Co are connected to the secondary side, and a load connected to the wireless power transmission system 1 is denoted by Ro.

The rectification circuit 40 is a full-wave rectification circuit including four diodes D1 to D4. A cathode of the diode D1 is connected to the output voltage Vo and an anode of the diode D1 is connected to the node N3. A cathode of the diode D2 is connected to the output voltage Vo and an anode of the diode D2 is connected to the node N4. A cathode of the diode D3 is connected to the node N3 and an anode of the diode D3 is connected to a secondary-side ground. A cathode of the diode D4 is connected to the node N4 and an anode of the diode D4 is connected to the secondary-side ground. The four diodes D1 to D4 may be respectively implemented by four switches.

The capacitor Co attenuates a ripple of the output voltage Vo. The capacitor Co may be charged by a current supplied through the rectification circuit 20, a current may be discharged to the load Ro from the capacitor Co.

An error voltage generator 50 includes a compensator 51 and an error amplifier 52.

The error amplifier 52 amplifies a difference between the output voltage Vo and a predetermined reference voltage Vref and outputs the amplified difference. The compensator 51 compensates the output of the error amplifier 52.

In detail, the compensator 51 is connected between an inverse terminal (−) and an output terminal of the error amplifier 52. The inverse terminal (−) of the error amplifier 52 is connected with the output voltage Vo or a voltage corresponding to the output voltage Vo, and an non-inverse terminal (+) of the error amplifier 52 is connected with the reference voltage Vref. The compensator 51 generates an error voltage VEA by compensating the output of the error amplifier 52 through proportional integral (PI) control. The error voltage VEA is an example of a feedback signal corresponding to an output of the wireless power transmission system, and the present invention is not limited thereto.

A regulation controller 60 generates a control signal VCON synchronized with a frequency at the primary side by sensing a current at the secondary side, and controls a switching operation Qs according to a result of comparison between the error voltage VEA and the control signal VCON. Impedance at the secondary side is changed according to a switching duty of the control switch Qs.

The primary-side frequency may be determined according to a switching frequency of the full-bridge inverter 20. The regulation controller 60 generates the control signal VCON by rectifying a voltage VIs that detects a current Is at the secondary side. Then, the control signal VCON is synchronized by the primary-side frequency.

The regulation controller 60 includes a control switch Qs, a capacitor Cs, a rectifier 61, a comparator 62, a gate driver 63, and a current sensor 64.

The control switch Qs and the capacitor Cs are connected in series between the node N3 and the node N4. A first electrode of the capacitor Cs is connected to the node N3 and a second electrode of the capacitor Cs is connected to a drain of the control switch Qs. A gate voltage Vgss is input to a gate of the control switch Qs and a source of the control signal Qs is connected to the node N4. A connection relation between the capacitor Cs and the control switch Qs may be different from the sequence shown in FIG. 1. For example, a connection sequence of the capacitor Cs and the control switch Qs may be changed to each other.

The current sensor 64 generates the voltage VIs by sensing the secondary-side current Is. The secondary-side current Is and the primary-side current Ip have the same frequency, and the primary-side current Ip is generated by being synchronized with a switching frequency of the full-bridge inverter 20.

The rectifier 61 generates the control signal VCON by full-wave rectifying the voltage VIs.

The comparator 62 generates a gate control signal Vgs according to a result of comparison between the control signal VCON and the error voltage VEA. The error voltage VEA is input to an inverse terminal (−) of the comparator 62 and a control signal VCON is input to a non-inverse terminal (+) of the comparator 62. The comparator 62 generates a gate control signal Vgs that enables the control switch Qs when the control signal VCON is higher than the error voltage VEA. In the opposite case, the comparator 62 generates a gate control signal Vgs that disables the control switch Qs.

In the exemplary embodiment, the enable-level of the gate control signal Vgs is described as high level and the disable-level of the gate control signal Vgs is described as low level. However, the present invention is not limited thereto. The gate driver 63 generates the gate voltage Vgss according to the gate control signal Vgs. For example, the gate driver 63 generates a high-level gate voltage Vgss according to a high-level gate control signal Vgs, and generates a low-level gate voltage Vgss according to a low-level gate control signal Vgs.

Figure 2:
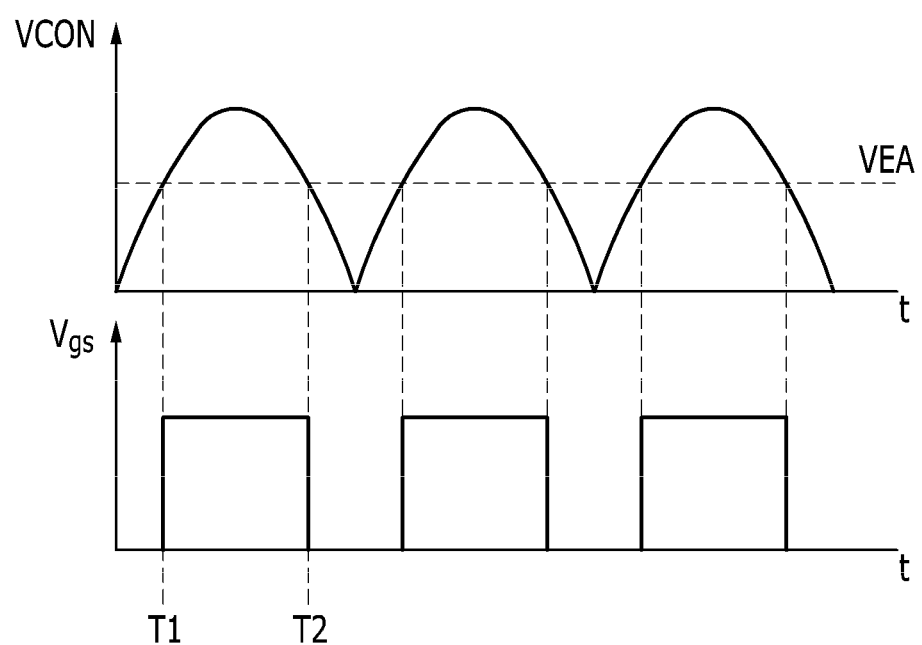
FIG. 2 is a waveform diagram of a control signal, an error voltage, and a gate control signal.

FIG. 2 is a waveform diagram of the control signal, the error voltage, and the gate control signal according to the exemplary embodiment of the present invention.

As shown in FIG. 2, when a rising control signal VCON reaches the error voltage VEA at T1, the gate control signal Vgs is increased to high level. Then, the control switch Qs is turned on and thus a part of the secondary-side current Is flows to the capacitor Cs of the regulation controller 60. When the control signal VCON becomes lower than the error voltage VEA at T2, the gate control signal Vgs is decreased to low level. Then, the control switch Qs is turned off and thus the secondary-side current Is is transmitted to the load through the rectification circuit 40.

Figure 3:
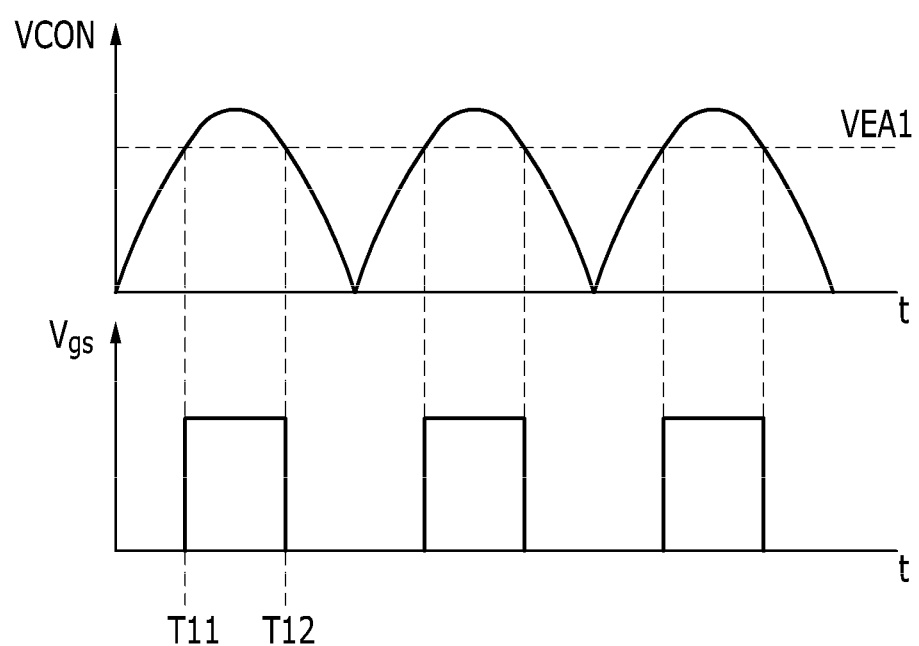
FIG. 3 and FIG. 4 are waveform diagrams provided for description of variation of the error voltage and the gate control signal according to increase or decrease of a load.
Figure 4:
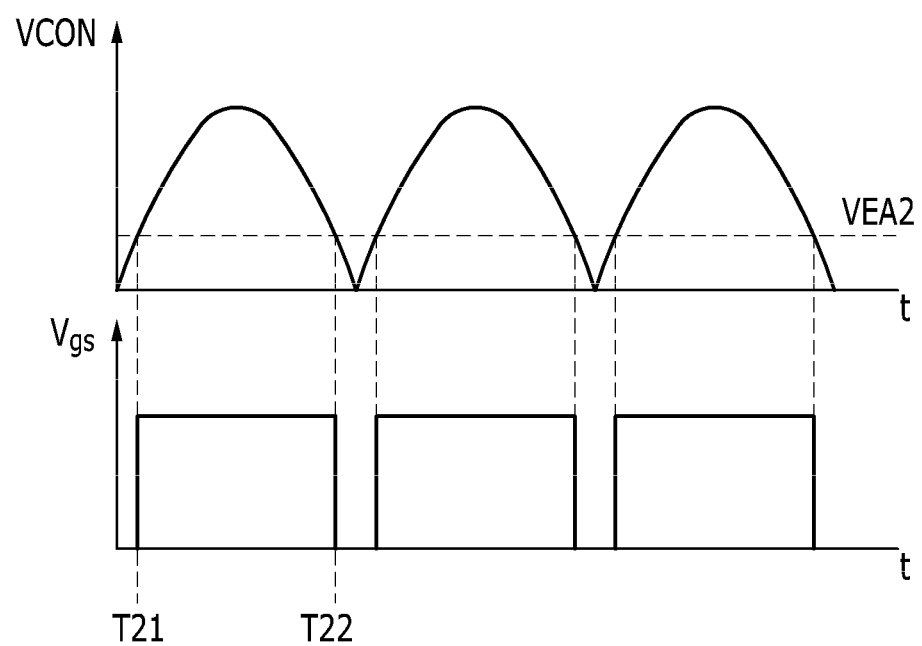

FIG. 3 and FIG. 4 are waveform diagrams provided for description of change in the error voltage and the gate control signal according to increase or decrease of the load.

FIG. 3 is a waveform diagram of a condition that the output voltage Vo is decreased due to increase of the load, and the error voltage VEA is increased.

As shown in FIG. 3, the error voltage VEA is more increased to VEA1 level compared to FIG. 2. Then, the control switch Qs is turned on for T11 to T12 during which the gate control signal Vgs is in the enabled state. In order to increase the amount of current transmitted to the load according to increase of the load, a current flowing to the regulation controller 60 needs to be reduced. For this, the duty of the control switch Qs is reduced compared to FIG. 2.

FIG. 4 is a waveform diagram of a condition that the output voltage Vo is increased due to decrease of the load, and the error voltage VEA is decreased.

As shown in FIG. 4, the error voltage VEA is more decreased to VEA2 level compared to FIG. 2. Then, the control switch Qs is turned on for T21 to T22 during which the gate control signal Vgs is in the enabled state. In order to decrease the amount of current transmitted to the load according to decrease of the load, a current flowing to the regulation controller 60 needs to be increased. For this, the duty of the control switch Qs is increased compared to FIG. 2.

As described, the secondary-side impedance is controlled according to the switching operation of the control switch Qs and thus the current supplied to the load can be controlled. In addition, the output voltage can be regulated only using the regulation controller 60 without using an additional active load or RF communication circuit. Since no active load is used, power consumption can be reduced, and the active load or the RF communication circuit is not additionally included, the structure of the wireless power transmission system can be simplified.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: wireless power transmission system
10: bridge-diode
20; full-bridge inverter
30: resonator
40: rectification circuit
CO1: primary coil
CO2: secondary coil

What is claimed is:
1. A wireless power transmission system, comprising:
a primary coil provided at a primary side of the wireless power transmission system;
a secondary coil provided at a secondary side of the wireless power transmission system;
a capacitor and a control switch electrically coupled in series between lateral ends of the secondary coil;
a regulation controller configured to generate a control signal corresponding to a sensed secondary-side current that flows through the secondary coil, and to control a switching operation of the control switch according to a result of a comparison between the control signal and a feedback signal corresponding to an output voltage of the wireless power transmission system;
an error amplifier configured to output a result of a comparison between the output voltage of the wireless power transmission system and a predetermined reference voltage; and
a compensator coupled between an output terminal of the error amplifier and an inverse terminal of the error amplifier and configured to generate an error voltage as the feedback signal by compensating an output of the error amplifier.

2. The wireless power transmission system of claim 1, wherein the regulation controller is configured to generate the control signal by rectifying a sense voltage that corresponds to the secondary-side current.

3. The wireless power transmission system of claim 1, wherein an impedance at the secondary side is changed according to the switching operation of the control switch.

4. The wireless power transmission system of claim 1, further comprising:
a current sensor configured to sense the secondary-side current and to generate a sense voltage corresponding to the sensed secondary-side current,
wherein the regulation controller comprises:
a rectifier configured to generate the control signal by rectifying the sense voltage;
a comparator configured to compare the control signal with the feedback signal; and
a gate driver configured to generate a gate voltage of the control switch according to an output of the comparator.

5. The wireless power transmission system of claim 1, further comprising a first resonance capacitor including a first electrode coupled to a first end of the secondary coil,
wherein the capacitor and the control switch are coupled in series between a second electrode of the first resonance capacitor and a second end of the secondary coil.

6. A driving method of a wireless power transmission system, comprising:
generating a primary-side current that flows to a primary coil at a primary side of the wireless transmission system;
magnetically coupling the primary coil to a secondary coil at a secondary side of the wireless power transmission system to generate a secondary-side current that flows through the secondary coil and has a same frequency as the primary-side current;
sensing the secondary-side current to generate a sense voltage that corresponds to the secondary-side current;
generating a control signal from the sense voltage;
generating a feedback signal corresponding to an output of the wireless power transmission system;
comparing the control signal to the feedback signal; and
controlling an impedance at the secondary side according to a result of comparing the control signal to the feedback signal,
wherein the wireless power transmission system comprises an error amplifier and a compensator coupled between an output terminal of the error amplifier and an inverse terminal of the error amplifier, and generating the feedback signal comprises:
comparing, using the error amplifier, the output voltage of the wireless power transmission system to a predetermined reference voltage; and
generating, using the compensator, an error voltage as the feedback signal by compensating an output of the error amplifier.

7. The driving method of the wireless power transmission system of claim 6, wherein the wireless power transmission system further comprises a capacitor and a control switch electrically coupled in series between lateral ends of the secondary coil, and controlling the impedance at the secondary side comprises controlling a switching operation of the control switch according to a result of comparing the control signal to the feedback signal.

8. The driving method of the wireless power transmission system of claim 6, wherein generating the control signal comprises:
generating the control signal by rectifying the sense voltage.

9. A wireless power transmission system comprising:
an inverter that is configured to generate a primary-side current at a primary side of the wireless power transmission system;
a primary coil to which the primary-side current flows at the primary side;
a secondary coil at a secondary side of the wireless power transmission system, the secondary coil being magnetically coupled to the primary coil;
a control switch across the secondary coil;
a first rectifier that is configured to generate a rectified voltage by rectifying a sense voltage that corresponds to a secondary-side current that flows through the secondary coil and has a same frequency as the primary-side current;
a second rectifier that is configured to rectify a voltage across the secondary side to generate an output voltage of the power transmission system;
an error amplifier configured to output a result of a comparison between the output voltage of the power transmission system and a predetermined reference voltage;
a compensator coupled between an output terminal of the error amplifier and an inverse terminal of the error amplifier and configured to generate an error voltage as a feedback signal by compensating an output of the error amplifier; and
a regulation controller that is configured to control a switching operation of the control switch based on a result of comparing the rectified voltage to the feedback signal.

10. The wireless power transmission system of claim 9, wherein the regulation controller further comprises a capacitor that is in series with the control switch.

11. The wireless power transmission system of claim 10, wherein the capacitor and the control switch are across lateral ends of the secondary coil.

* * * * *